(12) United States Patent
Ye et al.

(10) Patent No.: US 9,982,797 B2
(45) Date of Patent: May 29, 2018

(54) SOLENOID VALVE

(71) Applicant: Johnson Electric S.A., Murten (CH)

(72) Inventors: Cai Quan Ye, Shenzhen (CN); Carl Henric Andreas Svensson, Shenzhen (CN); Thomas Roschke, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 113 days.

(21) Appl. No.: 15/066,870

(22) Filed: Mar. 10, 2016

(65) Prior Publication Data
US 2016/0265678 A1    Sep. 15, 2016

(30) Foreign Application Priority Data

Mar. 11, 2015    (CN) .......................... 2015 1 0107003

(51) Int. Cl.
*F16K 31/06*    (2006.01)
*H01F 7/08*    (2006.01)
*H01F 7/127*    (2006.01)

(52) U.S. Cl.
CPC ...... *F16K 31/0696* (2013.01); *F16K 31/0627* (2013.01); *H01F 7/081* (2013.01); *H01F 7/127* (2013.01); *H01F 2007/083* (2013.01)

(58) Field of Classification Search
CPC ............ F16K 31/0627; F16K 31/0675; F16K 31/0696; H01F 2007/083; H01F 2007/086; H01F 7/127
USPC ....................................... 251/129.15, 129.21
See application file for complete search history.

(56) References Cited

U.S. PATENT DOCUMENTS

| | | | | |
|---|---|---|---|---|
| 2,861,594 A | * | 11/1958 | Collins | ............... F16K 31/0606 137/625.5 |
| 3,022,799 A | * | 2/1962 | Padula | ................ F16K 31/0606 137/625.27 |
| 3,023,777 A | * | 3/1962 | Collins | ............... F16K 31/0606 137/625.27 |
| 3,134,932 A | * | 5/1964 | Ray | .......................... H01F 7/12 251/129.17 |
| 3,422,850 A | * | 1/1969 | Caldwell | ............. F16K 31/0606 137/625.65 |
| 3,983,909 A | * | 10/1976 | Anglade | ................ F16K 11/056 137/625.5 |

(Continued)

FOREIGN PATENT DOCUMENTS

CN    104565497 A   *  4/2015

*Primary Examiner* — Seth W Mackay-Smith
(74) *Attorney, Agent, or Firm* — Muncy, Geissler, Olds & Lowe, P.C.

(57) ABSTRACT

A solenoid valve has a valve body with first and second passages; a coil wound around a coil bobbin; a stator with a third passage; a plunger having a through hole therein; a flux return device; and a spring. When the coil is energized, the plunger is attracted toward the stator such that the plunger closes the third passage, and connects the first passage with the second passage through the through hole in the coil bobbin. When the coil is not energized, the plunger moves away from the stator such that the plunger closes the first passage, and connects the second passage with the third passage. A resilient gasket between the stator and the flux return device reduces vibration from direct contact between the plunger and the stator, being transmitted to the flux return device, thereby reducing vibration and noise.

11 Claims, 9 Drawing Sheets

(56) References Cited

U.S. PATENT DOCUMENTS

| | | | | |
|---|---|---|---|---|
| 4,102,526 A | * | 7/1978 | Hargraves | F16K 31/0606 137/625.65 |
| 4,272,748 A | * | 6/1981 | Fugate | B41J 2/285 335/271 |
| 4,322,057 A | * | 3/1982 | Yamanaka | F16K 31/0606 137/625.65 |
| 4,326,696 A | * | 4/1982 | Ishikawa | F16K 31/0606 137/625.65 |
| 4,564,046 A | * | 1/1986 | Lungu | F16K 31/082 137/625.65 |
| 4,720,078 A | * | 1/1988 | Nakamura | F16K 31/0606 251/129.01 |
| 4,728,916 A | * | 3/1988 | Fontecchio | H01F 5/04 335/255 |
| 4,753,416 A | * | 6/1988 | Inagaki | F16K 31/06 137/625.65 |
| 4,830,332 A | * | 5/1989 | Miura | F16K 31/0655 251/129.07 |
| 4,922,965 A | * | 5/1990 | Meister | F16K 31/0606 137/625.65 |
| 5,010,923 A | * | 4/1991 | Kouda | B60G 17/0155 137/625.34 |
| 5,503,185 A | * | 4/1996 | Krause | F16K 31/0606 137/625.65 |
| 5,720,469 A | * | 2/1998 | Miyazato | B60T 8/363 251/129.15 |
| 5,992,461 A | * | 11/1999 | Gilmore | H01F 7/081 137/625.65 |
| 6,000,677 A | * | 12/1999 | Cook | F02M 25/0836 251/129.07 |
| 6,003,839 A | * | 12/1999 | Kobayashi | F02M 25/0836 251/129.15 |
| 6,019,120 A | * | 2/2000 | Najmolhoda | F16K 31/0631 137/625.61 |
| 6,202,672 B1 | * | 3/2001 | Ellis | A47C 27/082 137/223 |
| 6,425,409 B1 | * | 7/2002 | Cross | F16K 31/0606 137/15.18 |
| 6,820,651 B2 | * | 11/2004 | Seuret | F15B 13/0405 137/596.17 |
| 6,943,657 B2 | * | 9/2005 | Subramanian | F16K 31/0637 251/129.15 |
| 6,955,337 B2 | * | 10/2005 | Weber | F16K 31/0651 137/315.03 |
| 7,864,008 B2 | * | 1/2011 | Schilling | H01F 7/088 251/129.15 |
| 7,938,383 B2 | * | 5/2011 | Zur | H01F 7/126 251/129.15 |
| 8,061,685 B2 | * | 11/2011 | Ueda | F16K 31/0658 251/129.15 |
| 8,334,742 B2 | * | 12/2012 | Irwin | H01F 7/088 335/247 |
| 8,376,315 B2 | * | 2/2013 | Ogawa | F16K 31/0603 251/129.15 |
| 8,641,010 B2 | * | 2/2014 | Christensen | F16K 31/0675 251/129.15 |
| 9,377,123 B2 | * | 6/2016 | Kibune | F16K 27/029 |
| 2002/0113220 A1 | * | 8/2002 | Buse | F02M 37/0023 251/129.15 |
| 2002/0145125 A1 | * | 10/2002 | Tomoda | F16K 31/0631 251/129.15 |
| 2008/0272208 A1 | * | 11/2008 | Anderson | B65D 83/262 239/302 |
| 2015/0108382 A1 | * | 4/2015 | Svensson | F16K 31/02 251/129.19 |

* cited by examiner

SOLENOID VALVE

CROSS REFERENCE TO RELATED APPLICATIONS

This non-provisional patent application claims priority under 35 U.S.C. § 119(a) from Patent Application No. 201510107003.X filed in The People's Republic of China on Mar. 11, 2015, the entire contents of which are hereby incorporated by reference.

FIELD OF THE INVENTION

This invention relates to a solenoid valve and in particular, to a solenoid valve having low noise.

BACKGROUND OF THE INVENTION

Solenoid valves have been widely used in medical devices such as massaging machines. U.S. Pat. No. 5,992,461 discloses a conventional solenoid valve including a valve body and an electromagnetic body. The valve body has two ports. The electromagnetic body includes a U-shaped magnetically conductive member, a coil bobbin defining an inner hole, a coil wound around the coil bobbin, a stator disposed in one end of the coil bobbin, and a hollow plunger disposed in the other end of the coil bobbin. The stator has a third port. The plunger includes therein a pair of plugs and an inner spring between the plugs. An outer spring is disposed between the plunger and the stator. When the coil is energized, the plunger is magnetized and attracted to the stator such that the plug at the end of the plunger closes the third port of the stator, and the two ports of the valve body communicate with each other. When the coil is not energized, the plunger is returned to its initial position by the restoring force of the outer spring so as to close the first port of the valve body, and the second port of the valve body communicates with the third port of the stator.

In the above solenoid valve, the stator and the U-shaped magnetically conductive member are in rigid contact with each other. When the plunger moves towards the stator under the influence of the magnetic force, a large impact occurs when the two components make contact generating vibrations and noise. The vibrations are easily transmitted to the coil bobbin and U-shaped magnetically conductive member, thus generating a high level of noise. This noise may be disturbing for users and patients.

SUMMARY OF THE INVENTION

Hence there is a desire for a solenoid valve which generates less noise.

Accordingly, in one aspect thereof, the present invention provides a solenoid valve comprising: a valve body having a first passage and a second passage separated from the first passage; a coil bobbin comprising a main portion, a connecting portion extending from the main portion, and a mounting portion extending from one end of the connecting portion remote from the main portion, an axial through hole passing through the main portion, connecting portion and mounting portion of the coil bobbin, the mounting portion of the coil bobbin being connected to the valve body; a coil wound around the main portion of the coil bobbin; a stator movably mounted at one end of the through hole of the coil bobbin, the stator having a third passage; a plunger movably disposed in the through hole of the coil bobbin, the plunger being movable between an initial state and a working state; a flux return device fixed to the connecting portion of the coil bobbin; a resilient gasket disposed between the stator and the flux return device such that the stator is capable of axial deviation; and a spring disposed between the stator and the plunger for moving the plunger from the working state to the initial state. When the coil is energized, the plunger moves to the working state by magnetic attraction between the stator and the plunger, in which state the plunger contacts the stator and closes the third passage of the stator, and the first and second passages of the valve body communicate with each other through the through hole in the coil bobbin. When the coil is de-energized, the plunger moves to the initial state under the urging of the spring, in which state the plunger closes the first passage of the valve body, and the second passage of the valve body and the third passage of the stator communicate with each other.

Preferably, the plunger defines a through hole therein, two plugs are respectively mounted at axial ends of the through hole in the plunger, an inner spring is disposed in the through hole of the plunger and between the two plugs, each axial end of the plunger has a connecting hole, connecting the through hole of the plunger with the through hole of the coil bobbin.

Preferably, the plunger comprises a main body, the through hole in the plunger is disposed in the main body, the radially outer diameter of the two axial ends is less than the radially outer diameter of a middle portion of the main body, such that passageways are formed between the outer surfaces of the two axial ends of the main body and an inner surface of the through hole of the coil bobbin, and the passageways communicate with the through hole in the plunger via the connecting holes.

Preferably, the plunger further comprises a fastening cap, the fastening cap is attached over one of the axial ends of the main body of the plunger adjacent the valve body and receives the axial end and one corresponding plug therein to prevent the corresponding plug from being displaced from the through hole of the plunger, the fastening cap defines an axial through hole for allowing the corresponding plug to close the first passage of the valve body.

Preferably, a narrow gap is formed between the flux return device and an outer surface of the plunger, and the gap has a width less than 0.85 mm.

Preferably, the flux return device comprises a U-shaped frame and a flux plate, the frame includes a bottom portion and an open end opposite the bottom portion, the bottom portion of the frame defines a receiving hole, one end of the stator is loosely received in the receiving hole of the bottom portion of the frame, and the resilient gasket is disposed between the stator and the bottom portion of the frame.

Preferably, an outer edge of the flux plate is fixed to the open end of the frame, and an inner edge of the flux plate is fixed to the connecting portion of the coil bobbin by insert-molding, the inner edge of the flux plate defines a first through hole for allowing the plunger and part of the material of the connecting portion of the coil bobbin to pass there through, and a distance between the outer surface of the plunger and an edge of the first through hole of the flux plate is less than 0.85 mm.

Preferably, the flux plate has a plurality of second through holes, the material of the connecting portion of the coil bobbin fills the plurality of second through holes to form a plurality of connecting rods, and each of the connecting rods interconnects portions of the connecting portion of the coil bobbin located at opposite sides of the flux plate.

Preferably, a shoulder is formed on an outer surface of the stator for receiving the resilient gasket.

Preferably, a step is formed in an inner surface of the main portion of the coil bobbin and the step is configured to abut against an end surface of the stator.

Preferably, the coil bobbin is rotatably mounted to the valve body.

Preferably, the resilient gasket has an amount of compression ranging between 20% to 45%.

Preferably, the plunger has a travel ranging from 0.32 mm to 0.50 mm.

In the solenoid valve described in embodiments of the present invention, the stator is loosely fitted in the coil bobbin and in the receiving hole of the flux return device. The stator is in a suspended state supported by the resilient gasket, and the resilient gasket is made from an elastic material such as rubber. As such, a small amount of axial deviation of the stator 50 is permitted. When the plunger moves toward the stator under the influence of the electromagnetic attractive force and at the moment when the plunger contacts the stator, because the stator may be deviated in a direction away from the plunger, a large impact vibration is prevented from being produced by collision between the plunger and the stator, thereby reducing the vibration and noise from the source.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Referring to FIG. 1 through FIG. 7, a solenoid valve 10 in accordance with an embodiment of the present disclosure includes a valve body 20, a coil bobbin 30, a coil 40, a stator 50, a movable member 60, and a flux return device 70.

Figure 3:
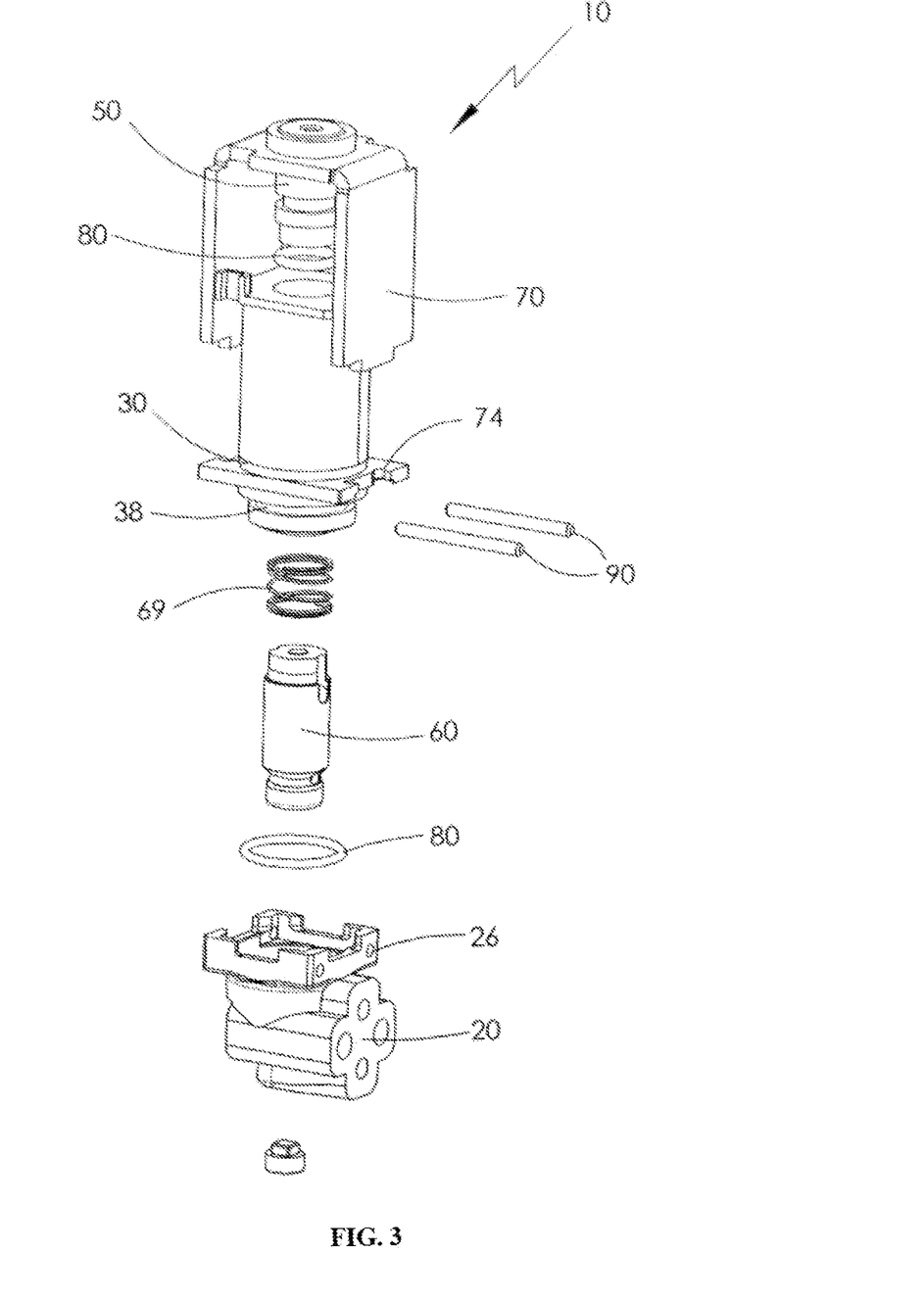
FIG. 3 is an exploded view of the solenoid valve of FIG. 1.
Figure 4:
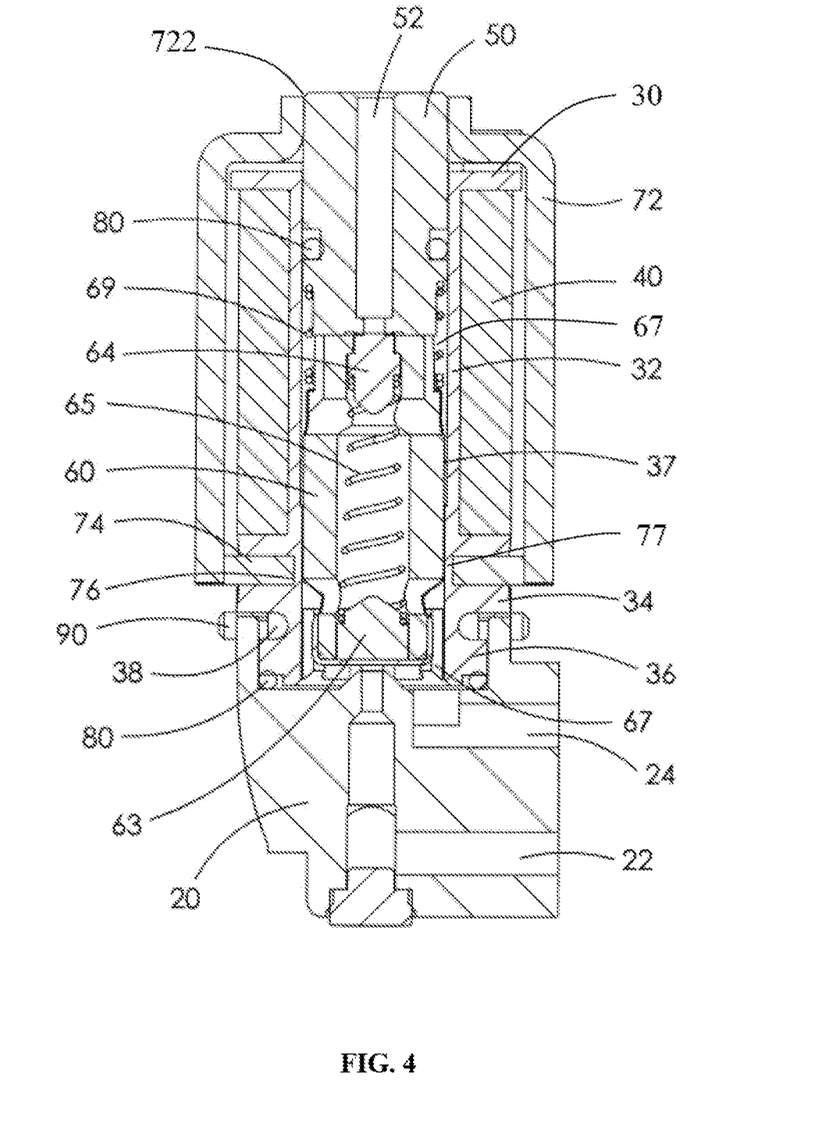
FIG. 4 is a sectional view of the solenoid valve of FIG. 1.

Preferably, the valve body 20 is made from a plastic material and has a plurality of passages. In the present embodiment, the valve body 20 includes a first passage 22 and a second passage 24. In the interior of the valve body 20, the first passage 22 and the second passage 24 are not in communication with each other.

The coil bobbin 30 is made from an insulating material such as plastic, which includes a main portion 32, a connecting portion 34, and a mounting portion 36. While the main portion 32 is a cylindrical hollow tube in shape in this embodiment, the main portion 32 may be of another shape such as a square or polygonal hollow tube depending upon actual design requirements. The connecting portion 34 extends radially from one end of the main portion 32 and is disposed between the main portion 32 and the mounting portion 36. A radial outer edge of the connecting portion 34 protrudes beyond the main portion 32 and the mounting portion 36. The mounting portion 36 is used to mount the coil bobbin 30 to the valve body 20. An axial through hole 37 extends through the whole coil bobbin 30 and is in communication with the first passage 22 and the second passage 24 of the valve body 20. Preferably, the size of the through hole 37 is uniform in the axial direction of the coil bobbin 30.

The coil 40 is wound around an outer surface of the main portion 32 of the coil bobbin 30.

The stator 50 is made from a magnetically conductive material such as a ferromagnetic material or a soft magnetic material, and is mounted at one end of the through hole 37 of the coil bobbin 30. A third passage 52 extends through the stator 50 in the axial direction of the solenoid.

Figure 5:
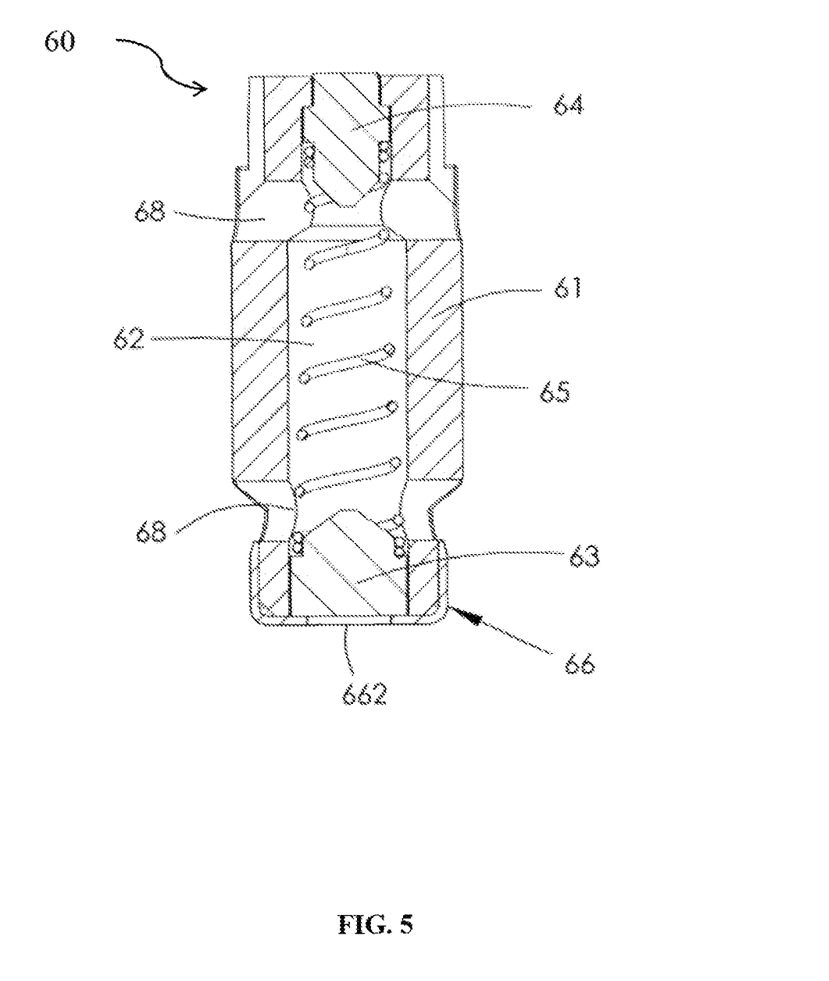
FIG. 5 is a sectional view of a plunger, being a part of the solenoid valve of FIG. 1.
Figure 6:
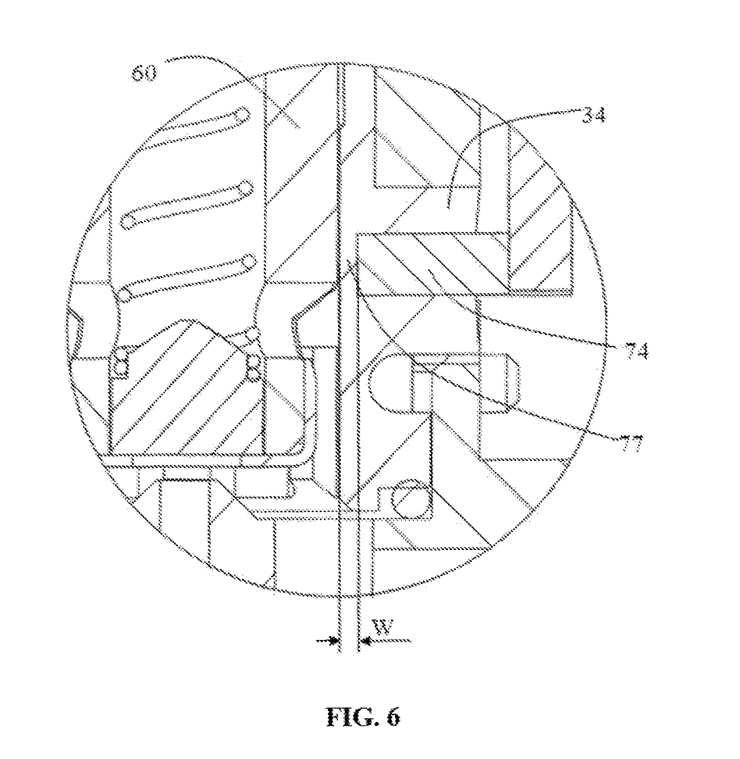
FIG. 6 is an enlarged view of a portion of FIG. 4.

The plunger 60 is made from a magnetically conductive material such as a ferromagnetic material or a soft magnetic material, and is movably mounted at the other end of the through hole 37 of the coil bobbin 30, opposite from the stator 50 in the axial direction. When the coil 40 is energized, the plunger 60 may move relative to the stator 50 under the influence of the magnetic field produced by the coil 40. Referring to FIG. 5, the plunger 60 includes a main body 61 with a central through hole 62 defined therein. Plugs 63, 64 are mounted at respective ends of the through hole 62. A first resilient member, such as a spring 65, is compressively disposed between the two plugs 63, 64 to bias the two plugs 63, 64 to outmost positions to close the corresponding passage 22 or 52. In this embodiment, under the influence of the resilient force of the spring 65, a distal end of the plug 64 protrudes beyond an end face of the main body 61 so as to extend out of the main body 61, such that when the solenoid valve 10 is in the energized state, the plunger 60 makes contact with the stator 50 and the plug 64 is resiliently pressed against the stator 50 to close the passage 52. Opposite ends of the spring 65 bear on the plugs and are preferably fixedly connected to the plugs 63, 64. A fastening cap 66 is attached over a distal end of the main body 61 of the plunger 60 adjacent the valve body 20 to receive the distal end and the plug 63 therein, thus preventing the plug 63 from falling out of the through hole 62 of the plunger 60. Preferably, the fastening cap 66 has a certain degree of resiliency. The fastening cap 66 defines a central through hole 662, allowing the plug 63 to close the passage 22 of the valve body 22. Preferably, a diameter of the through hole 662 is less than an outer diameter of the plug 63. Preferably, the end of the first passage adjacent the plunger protrudes towards the plunger to forma a seat for the plug 63 and is sized to enter the central hole 662 of the fastening cap to engage the plug 63.

An outer diameter of a middle portion of the main body 61 of the plunger 60 is substantially equal to or slightly less than a diameter of the inner hole of the coil bobbin 30. Outer surfaces of the axial ends of the main body 61 have a smaller diameter than the outer surface of the middle portion, such that passageways 67 are respectively formed between the outer surfaces of the two axial ends of the main body 61 and an inner surface of the coil bobbin 30. Each of two connecting holes 68 is disposed between the middle portion and a corresponding one of the two axial ends of the main body 61, which communicates the through hole 62 inside the main body 61 with a corresponding one of the passageways 67 outside the main body 61. A second resilient member, such as a spring 69, is disposed between the stator 50 and the plunger 60, for moving the plunger 60 back to its initial position when the solenoid valve 10 is in a non-energized state. Opposite ends of the spring 69 are connected to the stator 50 and the plunger 60, respectively.

Figure 7:
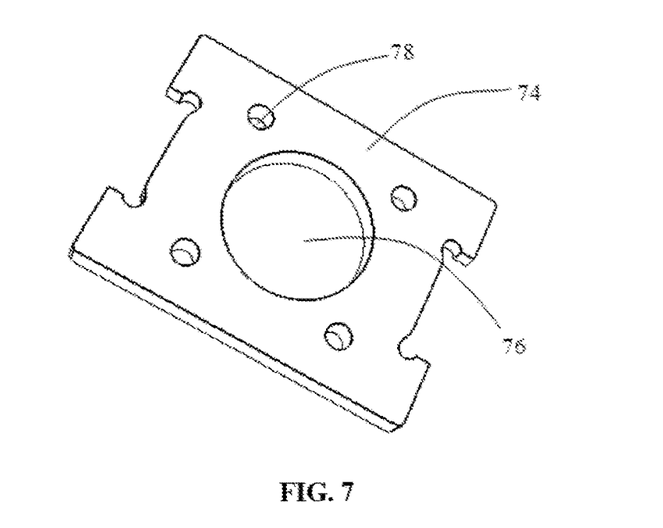
FIG. 7 illustrates a flux plate, being a part of the solenoid valve of FIG. 1.

The flux return device 70 is used to form a magnetic flux return path together with the stator 50 and the plunger 60 when the coil 40 is energized. In this embodiment, the flux return device 70 includes a U-shaped flux frame 72 and a flux plate 74. The frame 72 includes a bottomed end and a bottomless end opposite to the bottomed end. The stator 50 is fixed to the bottomed end of the frame 72. An outer side of the flux plate 74 is fixed to the bottomless end of the frame 72, and an inner side of the flux plate 74 is fixed to the connecting portion 34 of the coil bobbin 30 by insert-molding. The U-shaped frame 72 and the flux plate 74 are both made from a magnetically conductive material. Referring to FIG. 7, the flux plate 74 defines at a center thereof a first through hole 76 with a larger hole diameter, and a plurality of second through holes 78 with a smaller hole diameter is defined around the first through hole 76. The flux plate 74 is fixed to the connecting portion 34 of the coil bobbin 30 by insert-molding. During injection molding of the coil bobbin 30, the material that forms the coil bobbin 30 substantially encapsulates the flux plate 74, except for outer radial end portions of the flux plate 74, with part of the material passing through the first through hole 76 of the flux plate to form a connecting wall 77, and part of the material filling the second through holes 76 of the flux plate 74 to form connecting posts (not shown). The connecting wall 77 and the connecting posts together interconnect the material of the connecting portion 34 of the coil bobbin 30 that is located at opposite sides of the flux plate. The provision of the connecting posts can greatly enhance the strength of the coil bobbin 30. In particular, when the connecting wall 77 of the coil bobbin 30 disposed within the first through hole 76 of the flux plate 74 is thin, the strength enhancing effect may be more apparent.

The inner radial end of the flux plate 74 extends into the interior of the connecting portion 34 of the coil bobbin 30 as deep as possible to increase the contact area between the flux plate 74 and the connecting portion 34 of the coil bobbin 30, so as to form a secure connection. Preferably, the connecting wall 77 of the coil 30 disposed within the first through hole 76 of the flux plate 74 has a thickness less than 0.85 mm, thus resulting in a narrow air gap between an edge of the through hole of the flux plate 74 and the outer surface of the plunger 60. Preferably, the air gap has a width W less than 0.85 mm. In this embodiment, the width of the air gap is 0.5 mm. As such, the inner edge of the flux plate 74 is as close to the outer surface of the plunger 60 as possible, thereby reducing the air gap reluctance. In comparison with the conventional solenoid valve, no passage is required to be formed between the outer surface of the plunger 60 and the flux plate 74 and therefore, the width of the air gap between the two can be significantly reduced, thereby greatly increasing the electromagnetic attractive force between the plunger and the stator during operation of the solenoid valve.

The outer radial edge of the flux plate 74 can be fixedly connected to the open end of the frame 72 by soldering, crimping or in a detachable connection manner such as snap-fit. In this embodiment, the frame 72 is an integral structure. It should be understood that the frame 72 may be formed by two L-shaped parts that are fixedly connected to each other. Preferably, the bottom of the frame 72 defines a receiving hole 722, and one end of the stator 50 can be fixed in the receiving hole 722 of the frame 72 by means of, for example, soldering.

Sealing structures, such as an O-ring seals 80, may be disposed between the coil bobbin 30 and the valve body 20, and between the coil bobbin 30 and the stator 50.

Figure 1:
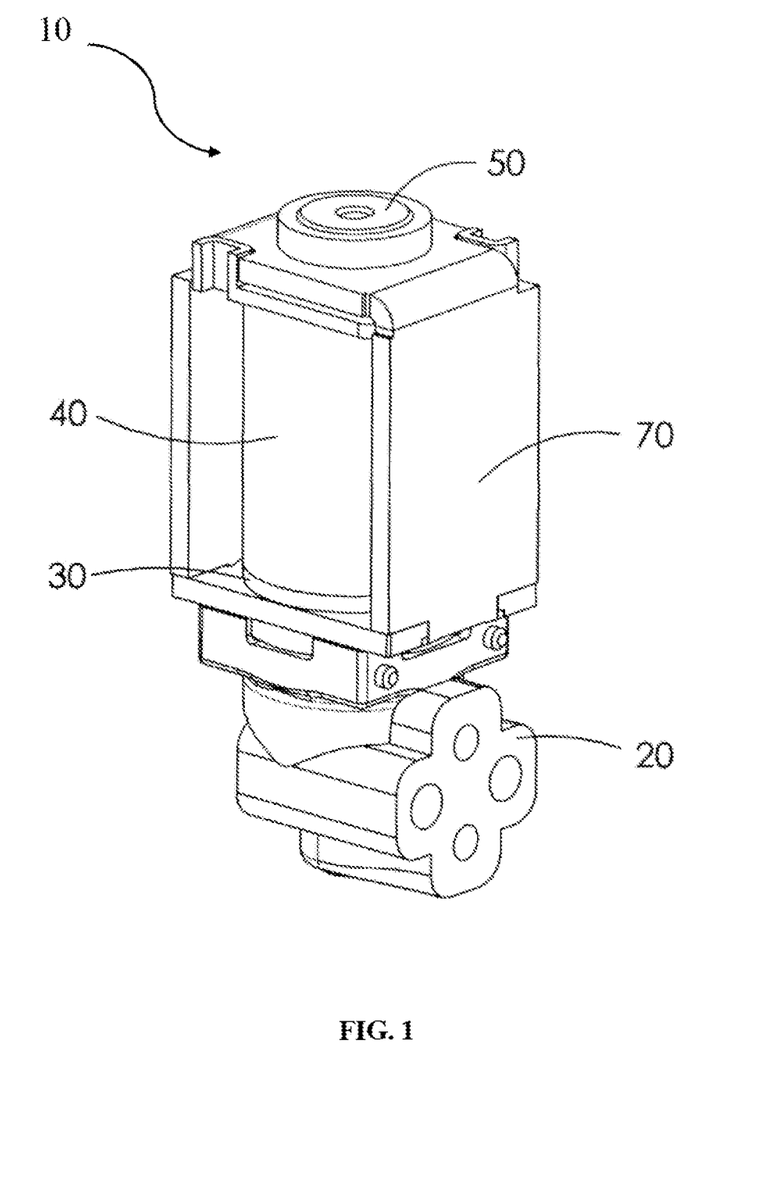
FIG. 1 is a view of a solenoid valve according to an embodiment of the present disclosure.
Figure 2:
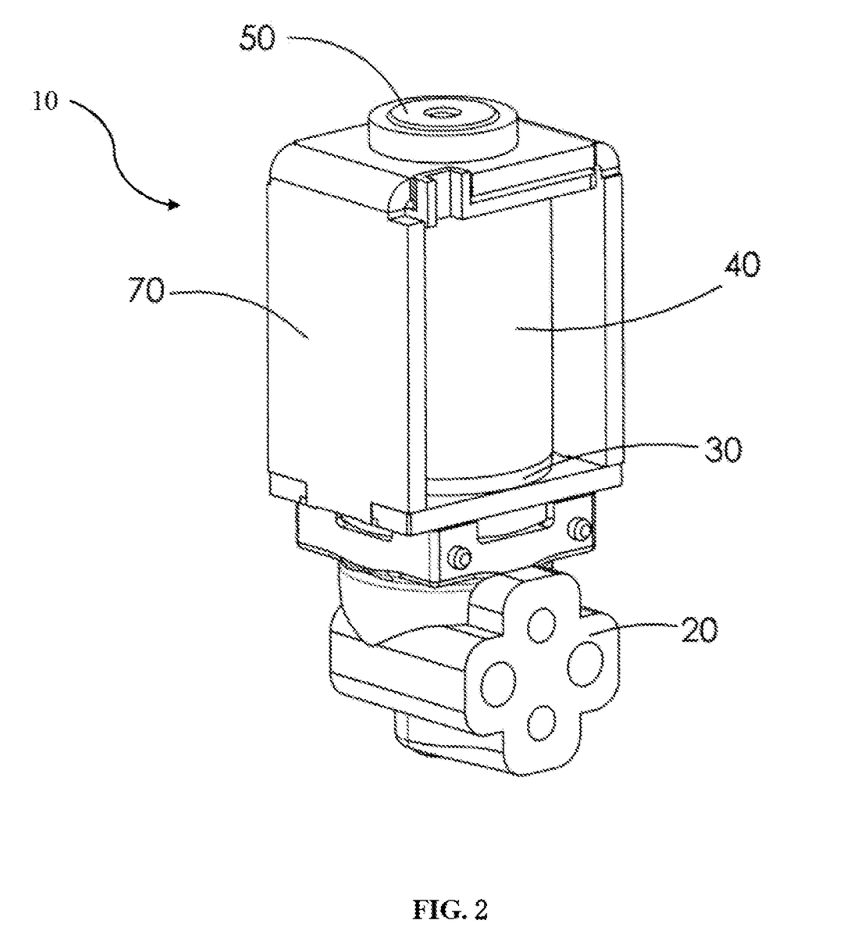
FIG. 2 is a view showing the valve body of the solenoid valve of FIG. 1 in another position relative to the electromagnetic body.

A pair of connecting rods 90 is used to connect the valve body 20 with the coil bobbin 30. Specifically, the mounting portion 36 of the coil bobbin 30 forms a round or arc groove 38, the valve body 20 forms a pair of connecting holes 26, and the connecting rods 90 pass through the respective connecting holes 26 and are then received in the groove 38 of the coil bobbin 30. As such, the valve body 20 is rotatably connected to the electromagnetic body (including the coil bobbin 30, coil 40, stator 50, plunger 60 and flux return device 70). Therefore, in the solenoid valve described in this embodiment, the valve body 20 is rotatable relative to the electromagnetic body, such that the orientation of the passages 22, 24 of the valve body 20 relative to the electromagnetic body may be adjusted to suit different orientation applications.

Understandably, the rotatable connection between the valve body 20 and the coil bobbin 30 may be achieved in another manner. For example, the round or arc groove is formed in the valve body, and the connecting holes are disposed in the coil bobbin.

The operational principle of the solenoid valve of the present invention is described in detail below.

In operation, the coil 40 is energized to produce a magnetic field, the plunger 60 is attracted by the stator 50 under the influence of the magnetic field, so as to move to a work position by overcoming the resilient force of the outer spring 69. In this work position, the plug 64 of the plunger 60 abuts against the end surface of the stator 50, thus sealing the passage 52 of the stator 50. The plug 63 is located spaced from the first passage 22 of the valve body 20, the first passage 22 and second passage 24 of the valve body 20 communicate with each other via the through hole 37 in the coil bobbin 30. A fluid such as air may enter via the first passage 22 of the valve and may flow out via the second passage 24. Upon cut-off of the power of the coil 40, the electromagnetic attractive force between the stator 50 and the plunger 60 disappears, such that the plunger 60 is returned to its initial position by the restoring force of the outer spring 69. In this initial position, the plug 63 of the plunger 60 seals the first passage 22 of the valve body 20, and the second passage 24 of the valve body and the passage 52 of the stator 50 communicate through the through hole 62 and the connecting holes 68 in the plunger 60 and the passageways 67.

Figure 8:
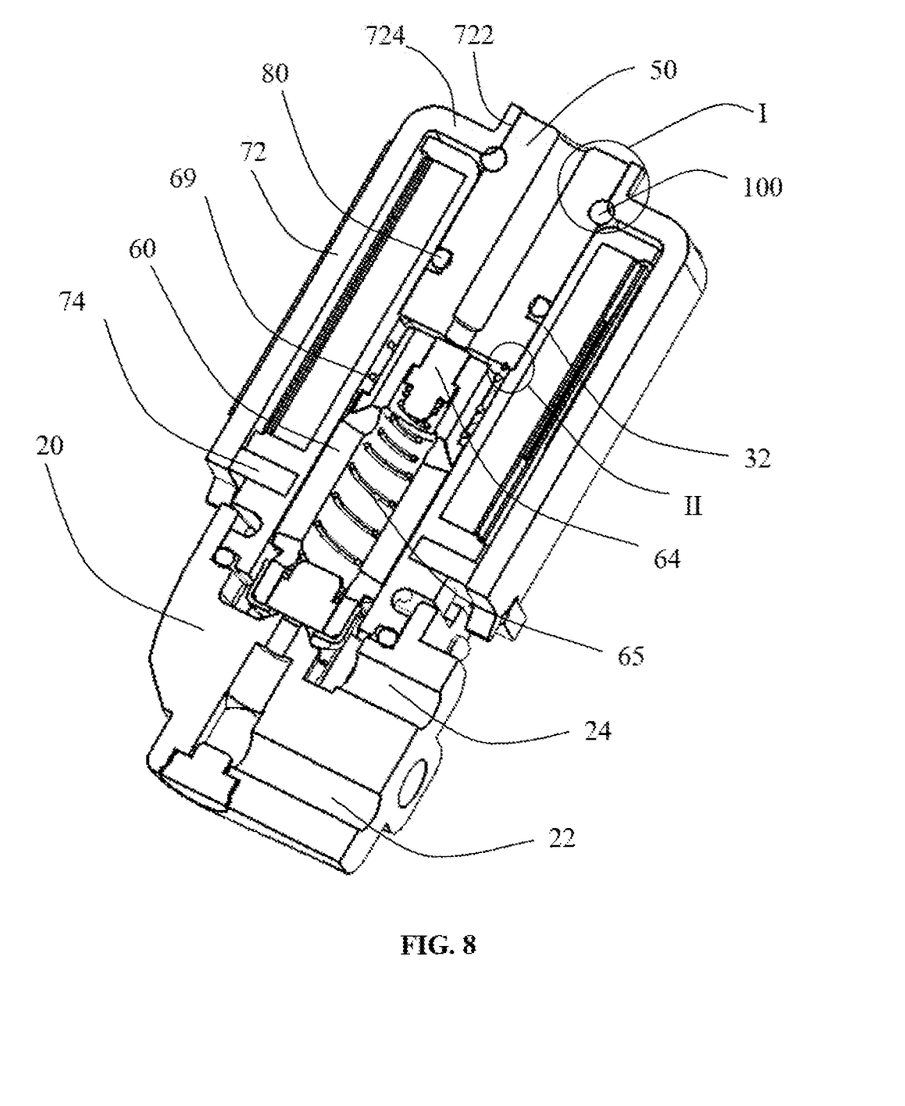
FIG. 8 is a sectional view of a solenoid valve according to a preferred embodiment of the present invention.
Figure 9:
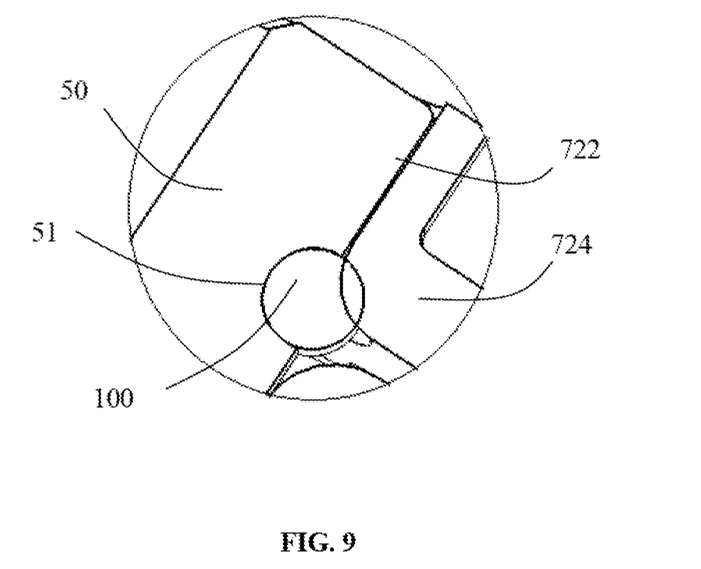
FIG. 9 is an enlarged view of an encircled portion I of FIG. 8.
Figure 10:
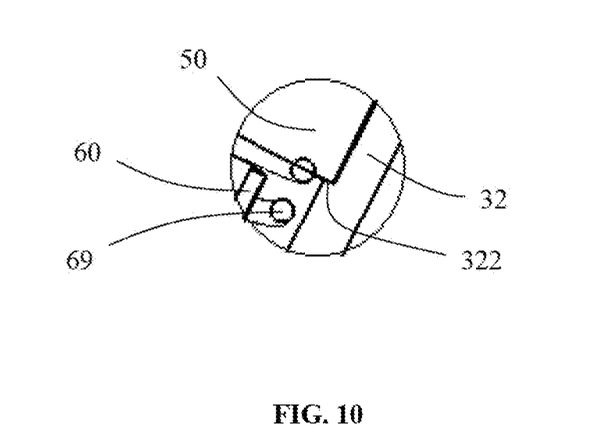
FIG. 10 is an enlarged view of an encircled portion II of FIG. 8.

FIG. 8 through FIG. 10 illustrate a solenoid valve according to another embodiment of the present invention, the operational principle of which is substantially the same as that of the previous embodiment. The differences lie in that: in this embodiment, the stator 50 is movably received in the receiving hole 722 of the bottom portion 724 of the frame 72 of the flux return device 70. The receiving hole 722 is preferably a through hole. A resilient gasket 100 is disposed between the stator 50 and the frame 72 of the flux return device 70. The resilient gasket 100 is an integral continuous O-shaped structure, such as a rubber O-ring. Specifically, an annular groove 51 is formed in the outer surface of the stator 50 adjacent the bottom portion of the frame 72, and the portion of the resilient gasket 100 that extends out of the groove 51 abuts against the bottom portion 724 of the frame 72 in the axial and radial directions. A step 322 is formed on an inner surface of the main portion 32 of the coil bobbin 30 adjacent the plunger 60, and an inner surface of the step 322 is disposed more inside than the outer surface of the stator 50, i.e. the inner surface of the step 322 and the outer surface of the stator 50 are partially overlapped in the radial direction. The resilient gasket 100 is compressed between the stator 50 and the bottom portion 724 of the frame 72, and the bottom portion 724 of the frame 72 exerts an axial push force toward the plunger 60 on the stator 50 through the resilient gasket 100, such that the end surface of the stator 50 contacts the step 322 of the main portion 32 of the coil bobbin 50, as shown in FIG. 10. That is, the stator 50 and resilient gasket 100 are resiliently sandwiched between the step 322 of the main portion 32 of the coil bobbin 30 and the bottom portion 724 of the frame 72 in the axial direction of the solenoid valve. Preferably, the amount of compression of the resilient gasket 100 ranges between 20% to 45%. A too large amount of compression reduces the noise-reduction result, and a too small amount of compression affects a positional accuracy of the stator.

In this embodiment, the stator 50 is loosely fit in the receiving hole 722 of the bottom portion 724 of the frame 72 of the flux return device 70, the stator 50 is supported by the resilient gasket 100, which is in a suspended state, and the resilient gasket 100 is made from an elastic material such as rubber. As such, a small amount of axial deviation of the stator 50 is permitted. When the stator coil 40 is energized, the plunger 60 moves toward the stator 50 under the influence of the electromagnetic attractive force. At the moment when the plunger 60 contacts the stator 50, because the stator 50 may be deviated in a direction away from the plunger 60, a large impact is prevented from being produced by collision between the plunger 60 and the stator 50, thereby reducing the vibration and noise from the source. Preferably, an O-ring seal 80 is disposed between the stator 50 and the coil bobbin 30.

The travel of the plunger 60 preferably ranges between 0.32 mm to 0.50 mm. A too large travel of the plunger 60 requires a too large electric current flowing through the stator coil, and a too small travel affects the flow of the fluid.

Figure 11:
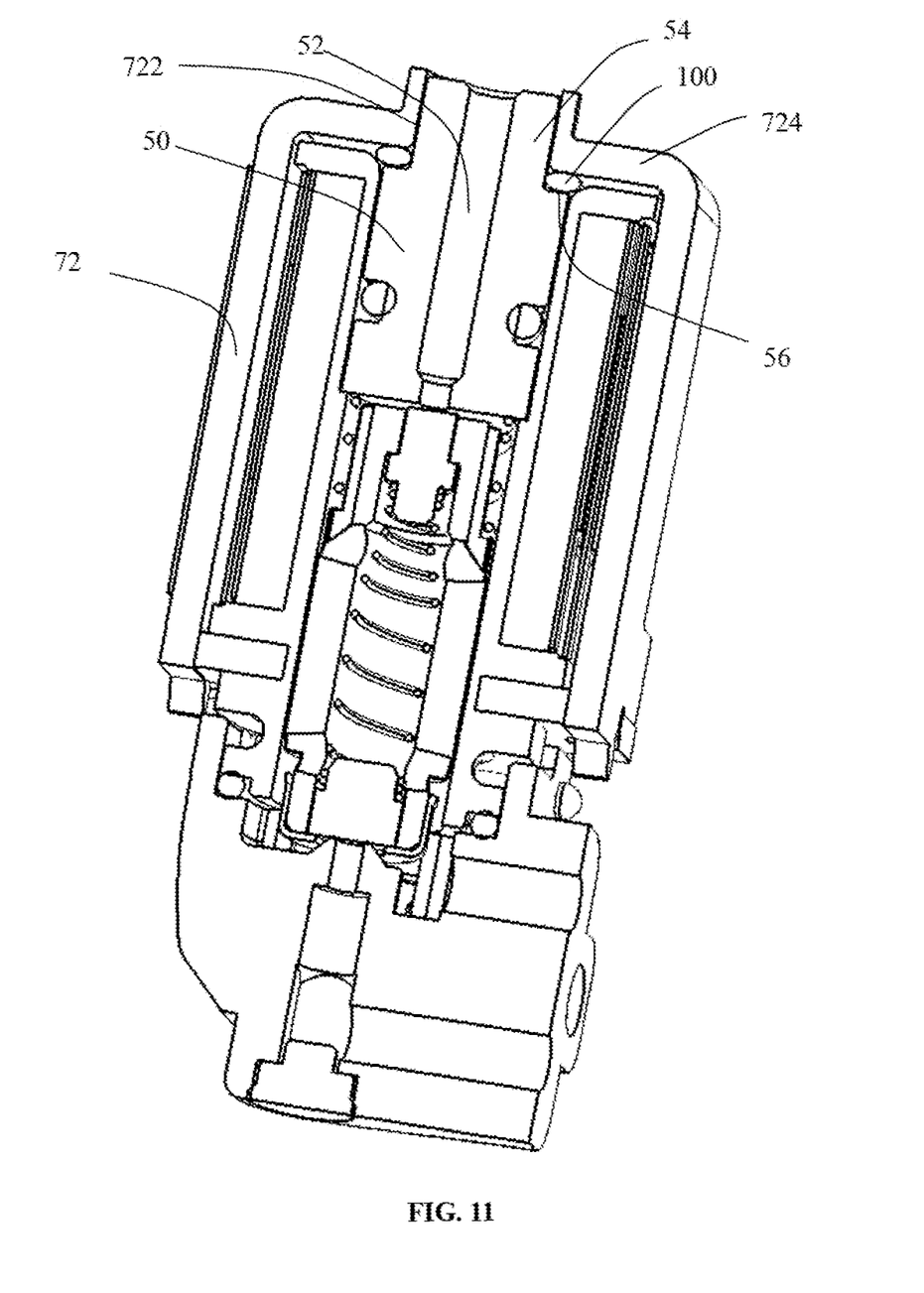
FIG. 11 is a sectional view of a solenoid valve according to another preferred embodiment of the present invention.

FIG. 11 is a sectional view of a solenoid valve according to a further embodiment of the present invention, which is different from the previous embodiment in that, in this embodiment, a received end 54 of the stator 50 that is received in the receiving hole 722 of the frame 72 has an outer diameter less than the outer diameter of an adjacent part of the stator 50, such that a shoulder 56 is formed at a junction of the received end 54 and the adjacent part. The resilient gasket 100 is attached around the received end 54 and is compressed between the shoulder 56 and the bottom portion 724 of the frame 72.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. solenoid valve comprising:
a valve body having a first passage and a second passage separated from the first passage;
a coil bobbin comprising a main portion, a connecting portion extending from the main portion, and a mounting portion extending from one end of the connecting portion remote from the main portion, an axial through hole passing through the main portion, connecting portion and mounting portion of the coil bobbin, the mounting portion of the coil bobbin being connected to the valve body;
a coil wound around the main portion of the coil bobbin;
a stator movably mounted at one end of the through hole of the coil bobbin, the stator having a third passage; and an annular groove is formed on an outer surface of the stator;
a plunger movably disposed in the through hole of the coil bobbin, the plunger being movable between an initial state and a working state; and the plunger comprises a main body with a through hole defined therein; a radially outer diameter of two axial ends is less than the radially outer diameter of a middle portion of the main body, such that passageways are formed between outer surfaces of the two axial ends of the main body and an inner surface of the through hole of the coil bobbin, and the passageways communicate with the through hole in the plunger; and each axial end of the plunger has a connecting hole connecting the through hole of the plunger with the passageways;
a flux return device fixed to the connecting portion of the coil bobbin; the flux return device comprises a frame, and the frame includes a bottom portion, and the bottom portion of the frame defines a receiving hole; one end of the stator is loosely received in the receiving hole of the bottom portion of the frame;
a resilient gasket disposed between the stator and the bottom portion of the frame, and a portion of the resilient gasket is received in a groove of the stator, and another portion of the resilient gasket that extends out of the groove abuts against the bottom portion of the frame in axial and radial directions such that the stator is capable of axial deviation; and
a spring disposed between the stator and the plunger for moving the plunger from the working state to the initial state,
wherein when the coil is energized, the plunger moves to the working state by magnetic attraction between the stator and the plunger, in which state the plunger contacts the stator and closes the third passage of the stator, and the first and second passages of the valve body communicate with each other via the through hole in the coil bobbin; and
wherein when the coil is de-energized, the plunger moves to the initial state under the urging of the spring, in which state the plunger closes the first passage of the valve body, and the second passage of the valve body and the third passage of the stator communicate via the through hole and the connecting holes in the plunger and the passageways.

2. The solenoid according to claim 1, wherein two plugs are respectively mounted at axial ends of the through hole in the plunger, an inner spring is disposed in the through hole of the plunger and between the two plugs, each axial end of the plunger has a connecting hole connecting the through hole of the plunger with the through hole of the coil bobbin.

3. The solenoid according to claim 2, wherein the plunger further comprises a fastening cap, the fastening cap is attached over an axial end of the main body of the plunger adjacent the valve body and receives said axial end and one corresponding plug therein to prevent the corresponding plug from being displaced from the through hole of the plunger, the fastening cap defines an axial through hole for allowing the corresponding plug to close the first passage of the valve body.

4. The solenoid according to claim 1, wherein a narrow gap is formed between the flux return device and an outer surface of the plunger, and the gap has a width less than 0.85 mm.

5. The solenoid according to claim 1, wherein the flux return device comprises a U-shaped frame and a flux plate, the frame includes an open end opposite from the bottom portion.

6. The solenoid according to claim 5, wherein an outer edge of the flux plate is fixed to the open end of the frame, and an inner edge of the flux plate is fixed to the connecting portion of the coil bobbin by insert-molding, the inner edge of the flux plate defines a first through hole for allowing the plunger and part of the material of the connecting portion of the coil bobbin to pass there through, and a distance between the outer surface of the plunger and an edge of the first through hole of the flux plate is less than 0.85 mm.

7. The solenoid according to claim 6, wherein the flux plate has a plurality of second through holes, the material of the connecting portion of the coil bobbin fills the plurality of second through holes to form a plurality of connecting rods, and each of the connecting rods interconnects portions of the connecting portion of the coil bobbin located at opposite sides of the flux plate.

8. The solenoid according to claim 1, wherein a step is formed in an inner surface of the main portion of the coil bobbin and the step is configured to abut against an end surface of the stator.

9. The solenoid according to claim 1, wherein the coil bobbin is rotatably mounted to the valve body.

10. The solenoid according to claim 1, wherein the resilient gasket has an amount of compression ranging between 20% to 45%.

11. The solenoid according to claim 1, wherein the plunger has a travel ranging from 0.32 mm to 0.50 mm.

* * * * *